United States Patent [19]
Takahashi et al.

[11] Patent Number: 5,365,543
[45] Date of Patent: Nov. 15, 1994

[54] TRANSMITTING CIRCUIT AND RECEIVING CIRCUIT

[75] Inventors: Kenichi Takahashi, Kawasaki; Hiroshi Ohnishi, Tokyo; Minako Takeishi, Kawasaki, all of Japan

[73] Assignee: Matsushita Electric Industrial Co., Ltd., Japan

[21] Appl. No.: 127,276

[22] Filed: Sep. 27, 1993

[30] Foreign Application Priority Data

Dec. 9, 1991 [JP] Japan .................. 3-324425
Sep. 28, 1992 [JP] Japan .................. 4-257795

[51] Int. Cl.⁵ .............................. H04K 1/00
[52] U.S. Cl. ................................ 375/1; 380/34
[58] Field of Search ..................... 375/1; 380/34

[56] References Cited

U.S. PATENT DOCUMENTS

| | | | |
|---|---|---|---|
| 4,037,159 | 7/1977 | Martin | 375/1 |
| 4,639,932 | 1/1987 | Schiff | 375/1 |
| 5,111,478 | 5/1992 | McDonald | 375/1 |
| 5,189,683 | 2/1993 | Cowart | 375/1 |
| 5,245,612 | 9/1993 | Kachi et al. | 375/1 |
| 5,299,229 | 3/1994 | Zscheile, Jr. et al. | 375/1 |

FOREIGN PATENT DOCUMENTS

62-53037 3/1987 Japan .

Primary Examiner—Tod R. Swann
Attorney, Agent, or Firm—Parkhurst, Wendel & Rossi

[57] ABSTRACT

In a first direct-sequence spread spectrum communication system having a transmission circuit where a data signal to be transmitted is coded by a first chip code signal and a receiving circuit for decoding the transmitted data signal with a second chip code signal, the synchronization between the said first and second chip code signals is performed when an asynchronous condition of said first and second chip code signals is detected over a predetermined interval. In a second direct-sequence spread spectrum communication system having a transmission circuit where a data signal having a variable data rate V to be transmitted is coded by a first chip signal having a data rate C and coded by a reference code signal having a data rate R, $C>V$, $R>V$. A receiving circuit receives the data signal from the above-mentioned transmission circuit decoded by a second chip signal and a second reference code signal. This receiving circuit has a lowpass filter and it is unnecessary to change the lowpass filter if the data rate V is lower than R. A third system combines these techniques.

9 Claims, 9 Drawing Sheets

TRANSMITTING CIRCUIT AND RECEIVING CIRCUIT

BACKGROUND OF THE INVENTION

1. Field of the Invention

This invention relates to a transmitting circuit and a receiving circuit employing the direct-sequence spread spectrum communication system.

2. Description of the Prior Art

Transmitting and receiving circuits employing the direct-sequence spread spectrum communication system are known. This prior art transmitting circuit transmits data with spectrum of data spread by mixing input data with a chip code signal (spread code signal) having a predetermined serial data pattern. This prior art receiving circuit receives the transmitted data by the transmitting circuit mentioned above and demodulates the data with inverse spread spectrum sequence.

Figure 8A:
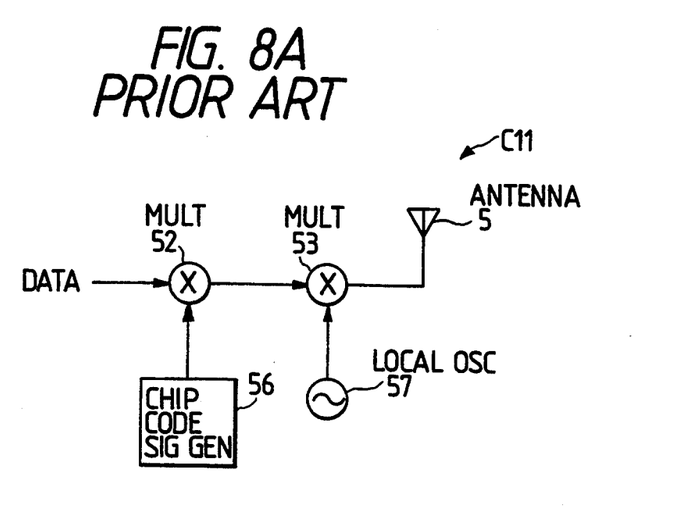
FIG. 8A is a block diagram of a prior art transmitting circuit employing the direct-sequence spread spectrum communication system.
Figure 8B:
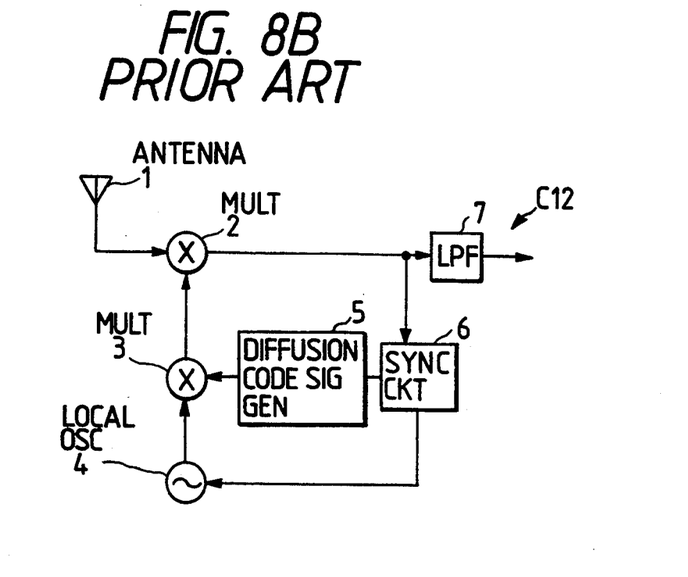
FIG. 8B is a block diagram of a prior art receiving circuit employing the direct-sequence spread spectrum communication system.
Figure 9:
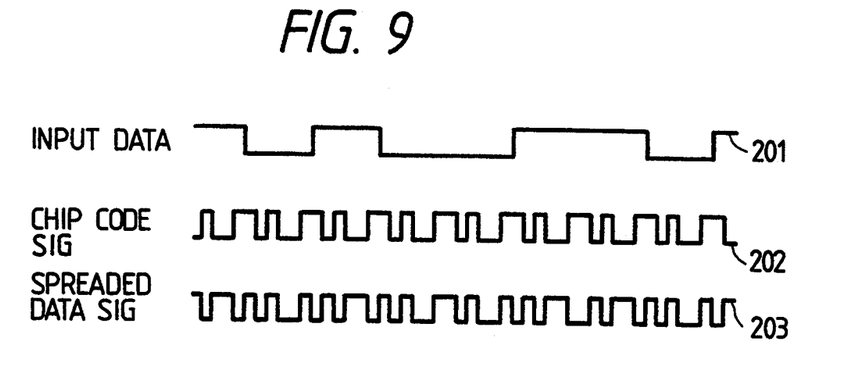
FIG. 9 shows waveforms observed in respective points of the prior art transmitting circuit which is also used in the description of the embodiments of this invention.

FIG. 8A is a block diagram of such a prior art transmitting circuit C11 employing the direct-sequence spread spectrum communication system. FIG. 8B is a block diagram of such a prior art receiving circuit C12 employing the direct-sequence spread spectrum communication system. FIG. 9 shows waveforms for explaining signals observed in respective points of this prior art transmitting circuit C11 which is also used in the description of the embodiments of this invention.

In FIG. 8A, the prior art transmitting circuit C11 comprises a chip code signal generator 56 for generating a chip code signal, a multiplexer 52 for multiplying an input data by the chip code signal, a local oscillator 57 for generating a local oscillation signal, a multiplexer 53 for multiplying an output of the multiplier 52 by the oscillation signal. An output of the multiplier 53 is transmitted by an antenna 54. The input data is subjected to the direct-sequence spectrum spreading by multiplying by the chip code signal with the multiplier 52. That is, as shown in FIG. 9. the input data as shown by waveform 201 is multiplied by the chip code signal as shown by waveform 202 with the multiplier 52 to produce a spread data signal as shown by waveform 203 of which spectrum is spread. As the chip signal, pseudnoise type signals (PN code) are popular. The multiplying the input data by this chip code signal spreads the spectrum of the input data. Generally, the chip code signal has a period natural number times a period of the data signal. In the example as shown in FIG. 9, one bit of data corresponds to one period of the chip signal.

The spread data is mixed with the local oscillation signal to be transmitted through the antenna 54.

The prior art receiving circuit C12 performs demodulation with inverse spread spectrum sequence. In FIG. 8B, the receiving circuit C12 comprises the chip code signal generator 5 for generating the chip code signal as shown by the waveform 202 which is the same signal as the output of the chip code signal generator 56 of the transmitting circuit C11, a local oscillator 4 for generating a local oscillation (carrier) signal having the same frequency as the local oscillator 57 of the transmitting circuit C11, a multiplier 3 for multiplying the local oscillation signal by the chip code signal (chip signal), a multiplier 2 for multiplying an input signal (data signal) received by an antenna 1 by the output of the multiplier 3, a lowpass filter 7 for filtering an output of the multiplier 2 to remove high frequency components, and a synchronizing circuit 6 responsive to the output of the multiplier 2 for generating an asynchronous condition signal. The local oscillator 4 generates the local oscillation signal under control of the synchronizing circuit 6. The output of the lowpass filter 7 is a demodulation signal of the input signal. The chip code signal generator 56 also performs synchronization between the input signal and the chip code signal in response to the asynchronous condition signal by phase-shifting the chip code signal having a predetermined data pattern continuously repeated.

When the chip code signal of the transmitting circuit C11 is out of phase with the chip code signal of the receiving circuit C12 or the frequency of the local oscillation signal of the transmitting circuit C11 does not agree with the local oscillation signal of the receiving circuit C12, for example, in the initial condition just after the power on condition, the original data signal cannot be demodulated. Therefore, the synchronizing circuit 6 should synchronize the chip signals of the transmitting and receiving circuits and make frequencies and timings of the local oscillation signals of the transmitting and receiving circuits equal. The synchronizing circuit 6 obtains synchronizing timings of the transmitting circuit C11 in the initial condition or the like. Then, in the following condition, namely, after synchronizing condition has been obtained, it observes the synchronizing condition and maintains this condition. When the asynchronous condition is detected the synchronizing circuit 6 and the chip code signal generation circuit 5 performs synchronization immediately.

More specifically, the synchronizing circuit 6 causes the chip code signal generation circuit 5 to synchronize the input signal with the chip code signal by consecutively phase shifting the predetermined serial data pattern continuously repeated until the data pattern is circulated once.

However, in the prior art receiving circuit C12, once the synchronizing timings are lost by crossing the transmission path between the transmitting and receiving circuits by an obstacle or the like, it takes a long period so obtain the synchronizing condition again in the direct-sequence spread spectrum communication system. Moreover, if the synchronization is obtained within a relatively short time, in the data communication, resending is required. Therefore, it takes a further long time to recover the receiving condition to the synchronous condition.

Moreover, in the prior art receiving circuit C12, when a data rate of the transmitted data is changed, another lowpass filter is necessary. Moreover, information indicative of changing the data rate should be transmitted before changing of the data rate. Such a system is inconvenient because the circuit scale is large.

SUMMARY OF THE INVENTION

The present invention has been developed in order to remove the above-described drawbacks inherent to the conventional transmitting circuit and the receiving circuit.

According to the present invention there is provided a receiving circuit for receiving a transmitted data signal which is coded by a first chip code signal having a predetermined signal pattern to spread spectrum of the transmitted data and is modulated by a carrier signal, the receiving circuit comprising: a receiving unit for receiving the transmitted data signal; a demodulation circuit for demodulating the received data signal; a chip code signal generation circuit for generating a second chip code signal having the predetermined signal pattern; a decoding circuit for decoding the demodulated data signal with the second chip code signal; a detection circuit for detecting whether the second chip code signal is in an asynchronous condition with the received data signal to produce an asynchronous detection signal; a synchronizing circuit for synchronizing the second chip code signal with the first chip code signal included in the received data signal in response to the asynchronous detection signal; and a control circuit responsive to the detection circuit for measuring a time interval for which the asynchronous detection signal is produced continuously and for supplying the asynchronous detection signal to the synchronizing means when the time interval is longer than a predetermined interval.

According to the present invention there is also provided a transmitting circuit for transmitting a data signal having variable data rate V, comprising: a first coding circuit for coding the data signal with a first coding signal (reference signal) having a first predetermined signal pattern and a first data rate R; a second coding circuit for coding the data signal with a second coding signal (chip signal) having a second predetermined signal pattern and a second data rate C; and a modulation circuit for modulating the data signal coded by the first and second coding signals, the second data rate C being higher than the variable data rate V in order to spread spectrum of the data signal, the first data rate R being higher than the variable data rate V in order to provide a lower limitation of a data rate of the data signal coded by the first coding means.

According to the present invention there is further provided a receiving circuit for receiving a transmitted data signal which has a variable data rate V and is coded by a first chip code signal having a first predetermined signal pattern to spread spectrum of the transmitted data and a data rate C, the transmitted data signal being coded by a first reference code signal having a second predetermined signal pattern and having a data rate R, the transmitted data signal being modulated by a carrier signal, the data rate C being higher than the variable data rate in order to spread spectrum of the data signal, the data rate R being higher than the variable data rate V in order to provide a limitation of a data rate of the data signal coded by the reference code signal, the receiving circuit comprising: a receiving unit for receiving the transmitted data signal; a demodulation circuit for demodulating the received data signal; a chip code signal generation circuit for generating a second chip code signal having the predetermined signal pattern; a decoding circuit for decoding the demodulated data signal with the second chip code signal; a detection circuit for detecting whether the second chip code signal is in an asynchronous condition with the received data signal to produce an asynchronous detection signal; a synchronizing circuit for synchronizing the second chip code signal with the first chip code signal included in the received data signal in response to the asynchronous detection signal; a control circuit responsive to the detection means for measuring a time interval for which the asynchronous detection signal is produced continuously and for supplying the asynchronous detection signal to the synchronizing means when the time interval is longer than a predetermined interval; a reference code signal generation circuit for generating a second reference code signal having the predetermined signal pattern; and a second decoding circuit for decoding the demodulated data signal with the second reference code signal.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention.

Figure 1:
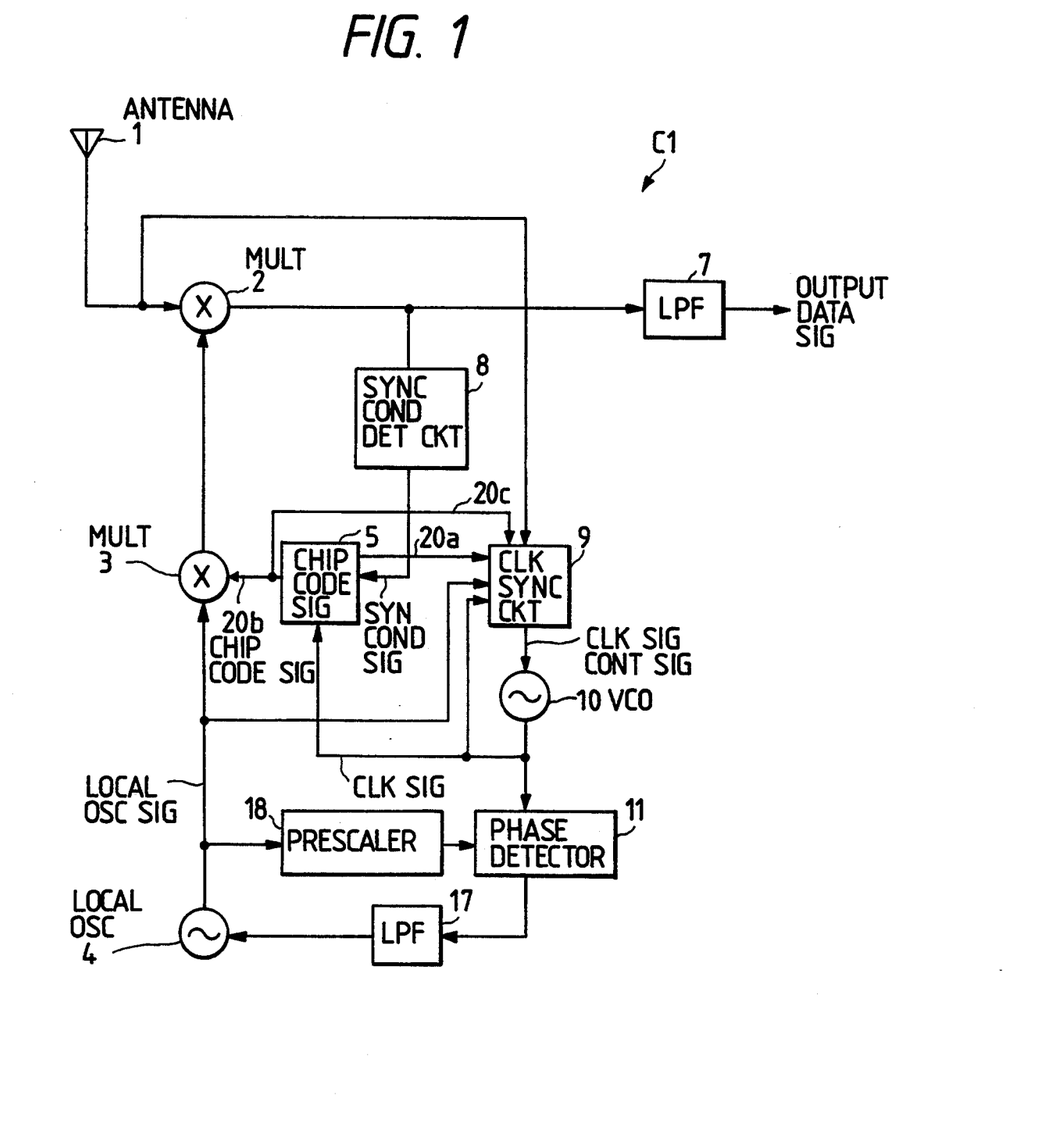
FIG. 1 is a block diagram of the first embodiment of receiving circuit.

FIG. 1 is a block diagram of the first embodiment of receiving circuit C1 employing the direct-sequence spread spectrum communication system.

The receiving circuit C1 of this embodiment performs demodulation by inverse spread spectrum sequence from an input signal received by an antenna 1, the input signal including data modulated by a carrier signal with direct-sequence spectrum spreading, that is, the signal transmitted from the transmission circuit C11 of the prior art, for example. In FIG. 1, the receiving circuit C1 comprises: a chip code signal generator 5 for generating a chip code signal 20b as shown by the waveform 202 which is the same signal as the output of the chip code signal generator 56 of the prior art transmitting circuit C11 as shown in FIG. 8A, the chip code signal generator 56 also generating chip signals 20a and 20c, a local oscillator 4 for generating a local oscillation signal having the same frequency as the local oscillator 57 of the prior art transmitting circuit C11; a multiplier 8 for multiplying the local oscillation signal by the chip code signal; a multiplier 2 for multiplying an input signal (data) received by the antenna 1 by the output of the multiplier 8; a lowpass filter 7 for filtering an output of the multiplier 2 to output an output data signal with high frequency components removed a first synchronizing condition detection circuit 8 responsive to the output of the multiplier 2 for detecting a synchronizing condition of the chip code signal 20b generated by tile chip code signal generation circuit 5 to generate a synchronizing condition signal; a clock synchronizing circuit 9 responsive to the input signal, the chip signal 20a, the chip signal 20c, the local oscillation signal, and a clock signal CLK for generating a clock signal control signal; a clock signal generation circuit (VCO) 10 for generating the clock signal with an oscillation frequency controlled by the clock signal control signal; a pre-scaler 18 for frequency dividing the local oscillation signal; a phase detector 11 for detecting a phase difference between the divided local oscillation signal and the clock signal CLK, and a lowpass filter 17 for filtering the output of the phase detector to supply a frequency control signal to the local oscillator 4.

Figure 10:
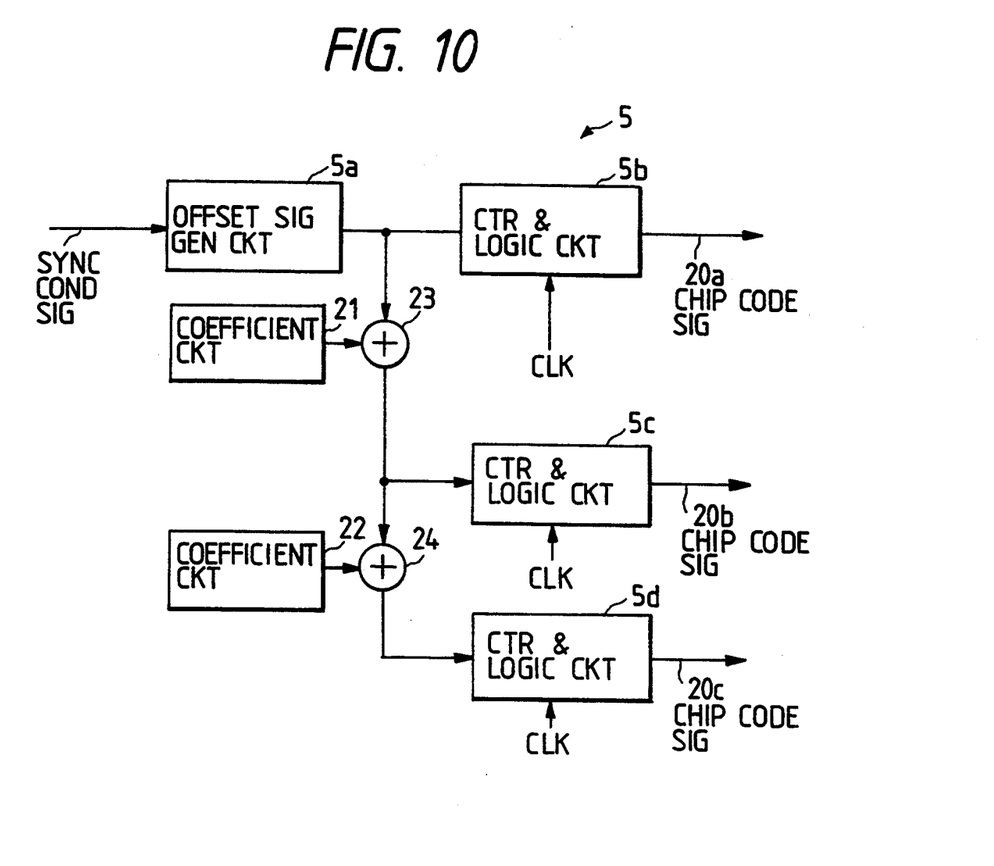
FIG. 10 is a block diagram of the chip code signal generation circuit of first to third embodiments of this invention.

The chip code signal generation circuit 5 generates the chip code signals 20a–20c in response the clock signal and the synchronizing condition signal. More specifically, the chip code signal generation circuit 5 generates the chip code signals 20a–20c with unchanging of a phase relation of the data pattern of the chip code signal 20b against the input signal when the synchronizing condition signal indicates a synchronized condition and it generates the chip code signals 20a–20c with changing of a phase relation of the data pattern of the chip code signals 20a–20c against the input signal when the synchronizing condition signal indicates an asynchronous condition successively until the synchronizing condition signal indicates the synchronous condition. The data pattern is predetermined and is repeatedly outputted. Therefore, there is always one synchronizing condition within one circulation of the data pattern, so that the synchronizing condition can be caught by the successive phase shifting of the chip code signal and during this, the synchronizing condition signal is monitored. FIG. 10 is a block diagram of the chip code signal generation circuit 5 of first to third embodiments of this invention. The chip code signal generation circuit 5 comprises an offset signal generation circuit 5a for generating an offset signal in the presence of the synchronizing condition signal indicative of an asynchronous condition and a counter-and-logic circuit 5c responsive to the clock signal CLK for generating chip code signal 20b having the predetermined serial data pattern as shown by waveform 202 in accordance with the offset signal via adder 23. That is, the offset signal generation circuit 5a generates an offset value for a counter included in the counter and logic circuit 5c and change the offset value consecutively to change a phase of the chip code signal 20b against the received signal during the reception of the synchronizing condition signal. This chip signal is supplied to the multiplier 3. Further, the chip code signal generation circuit 5 comprises a coefficient circuit 21 for generating a coefficient value, the adder 23 for adding the coefficient value to the output of the offset value, a coefficient circuit 22 for generating the other coefficient value, the adder 24 for adding the other coefficient value to the output of the adder 23. Therefore, the offset value supplied to the counter-and-logic circuits 5b, a value supplied to the counter-and-logic circuits 5c, a value supplied to the counter-and-logic circuits 5d increase in the order mentioned. This provides a set of chip signals 20a–20c. The coefficient value from the coefficient circuit 21 provides one-chip interval delay and the other coefficient value from the coefficient circuit 22 provides one more one-chip interval delay. The chip signal 20b is used for actual modulation of the input signal, so that the chip signal 20a is one-chip-interval advanced chip code signal and the chip signal 20c is one-chip-interval delayed chip code signal.

The clock synchronizing circuit 9 generates the clock signal control signal by comparing a clock signal component included in the input signal with the chip signals 20a and 20b.

Figure 13:
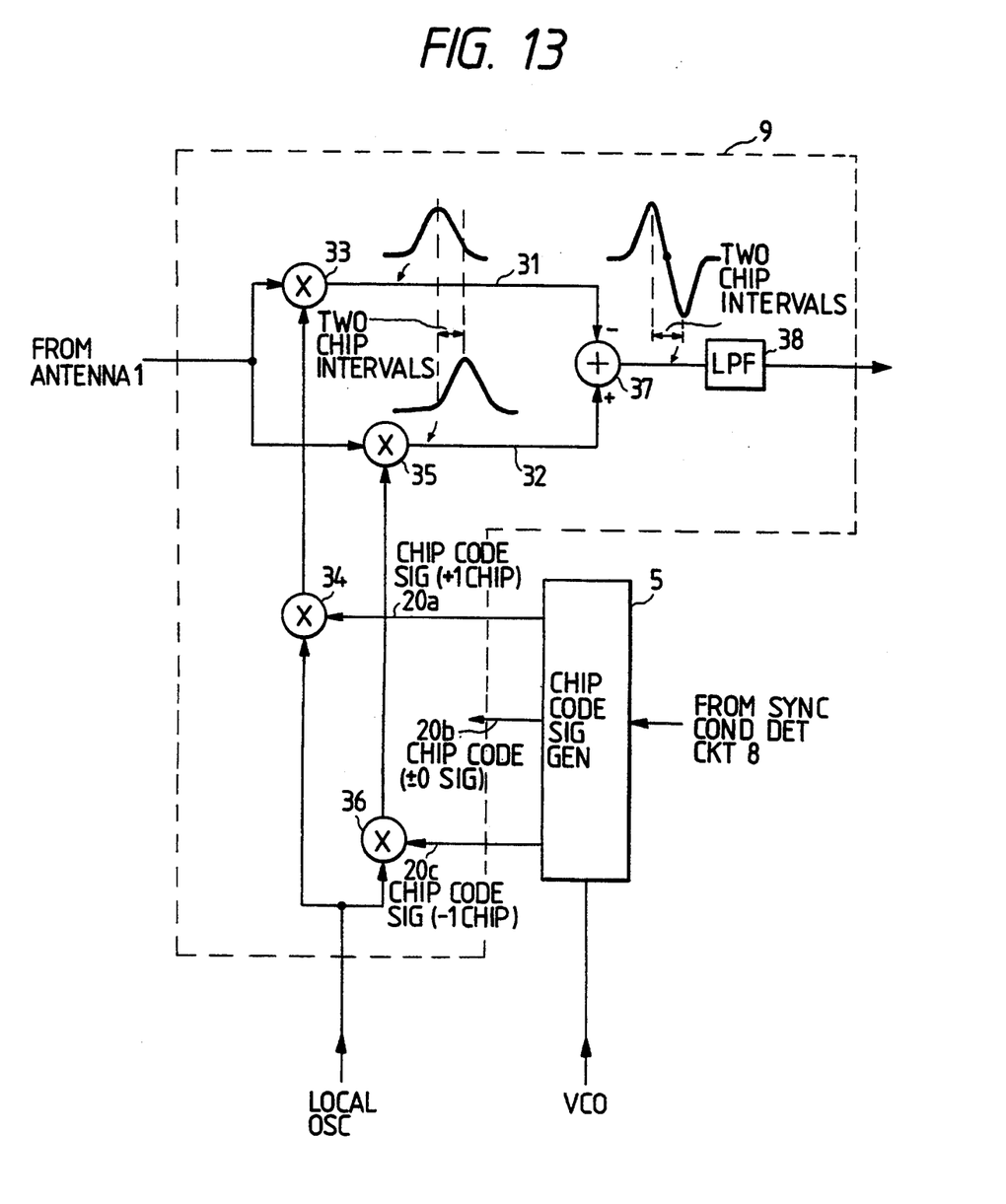
FIG. 13 is a block diagram of the clock synchronizing circuit of the first to third embodiments.

FIG. 13 is a block diagram of the clock synchronizing circuit 9 of the first to third embodiments.

The clock synchronizing circuit comprises: a multiplier 34 for multiplying the local oscillation signal by the chip code signal 20a, a multiplier 36 for multiplying the local oscillation signal by the chip code signal 20c, a multiplier 33 for multiplying the input signal by an output of the multiplier 34, a multiplier 35 for multiplying the input signal by an output of the multiplier 36, an adder 37 for adding an output of the multiplier 33 to the output of the multiplier 35, and a lowpass filter 38 for filtering the output of the adder 37. The output of the multiplier 33 represents a correlation between the chip signal component included in the input signal and the one-chip-interval advanced chip signal 20a. The output of the multiplier 35 represents a correlation between the chip signal component included in the input signal and the one-chip-interval delayed chip signal 20c. Therefore, an average value between the output of the multipliers 33 and 35 provides the clock signal control signal. The lowpass filter 38 effects this averaging. The clock signal control signal is supplied to the VCO 10 to control an oscillation frequency of the VCO 10. The clock synchronizing circuit 9 monitors the input signal always and continuously controls the oscillation frequency of the VCO 10.

The phase detector 11, the lowpass filter 17, the local oscillator 4, and the pre-scaler 18 form a PLL (phase-locked-loop) to generates the local oscillation signal with frequency controlled by the clock signal CLK.

Hereinbelow will be described an operation of the receiving circuit C1.

The input signal received by the antenna 1 is multiplied by an output signal of the multiplier 3 including the local oscillation signal component and the chip code signal component to decode the input signal.

When the chip code signal included in the chip code signal 20b is in phase with the chip code signal included in the received input signal, the output of the multiplier 2 is outputted through the lowpass filter 7 as it is. However, when the chip code signal 20b of the receiving circuit C1 is out of phase with the chip code signal included in the received input signal, the input signal cannot be decoded because a magnitude of the output of the multiplier 2 is small. Therefore, a synchronizing operation is required.

Figure 2:
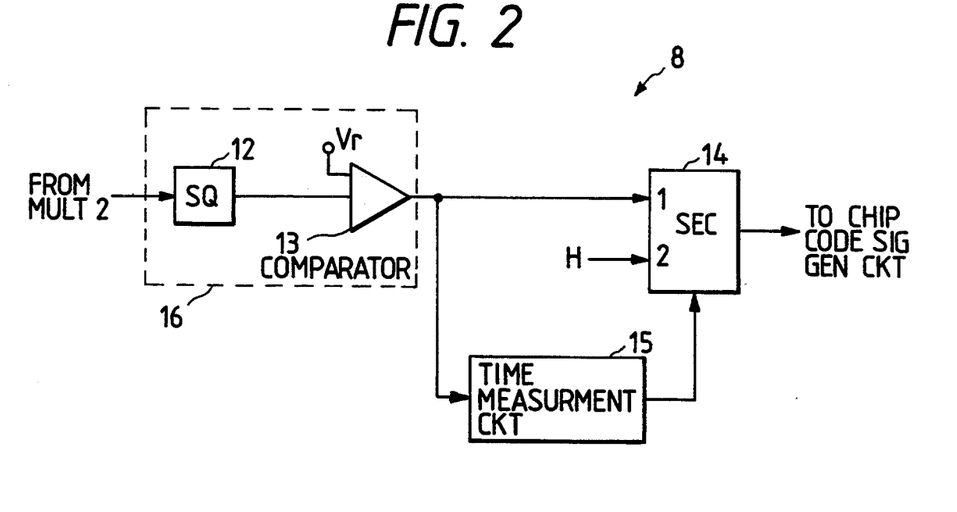
FIG. 2 is a block diagram of the first embodiment of a synchronizing condition detection circuit shown in FIG. 1.

FIG. 2 is a block diagram of the first embodiment of the first synchronizing condition detection circuit 8. The first synchronizing condition detection circuit 8 comprises: a squaring circuit for squaring the output of the multiplier 2 to detect a degree of synchronizing condition of the chip code signal with the received input signal; a comparator 13 for comparing an output of the squaring circuit 12 with a reference voltage Vr to produce an in-phase/out-of-phase signal; a selection circuit 14 for selecting either of input "1", namely, the in-phase/out-of-phase signal or input "2", namely, logic High level; and a time measurement circuit 15 for measuring intervals of in-phase and out-of-phase conditions. That is, this first synchronizing condition detection circuit 8 includes the time measurement circuit 15 and the selection circuit 14 in addition to a conventional synchronizing detection circuit 16 including the squaring circuit 12 and the comparator 13.

The first synchronizing condition detection circuit 8 causes the chip code signal generation circuit 5 to synchronize the chip code signal 20b with the received input signal in the initial condition, such as a condition just after the power ON condition and when the out-of-phase condition continues for a predetermined interval T2. On the other hand, the first synchronizing condition detection circuit 8 does not cause the chip code signal generation circuit 5 to synchronize the chip code signal 20b with the received input signal when the in-phase condition continues and when the out-of-phase condition continues for less than a predetermined interval T1.

The time measurement circuit 15 comprises a microprocessor having a ROM.

Figure 3:
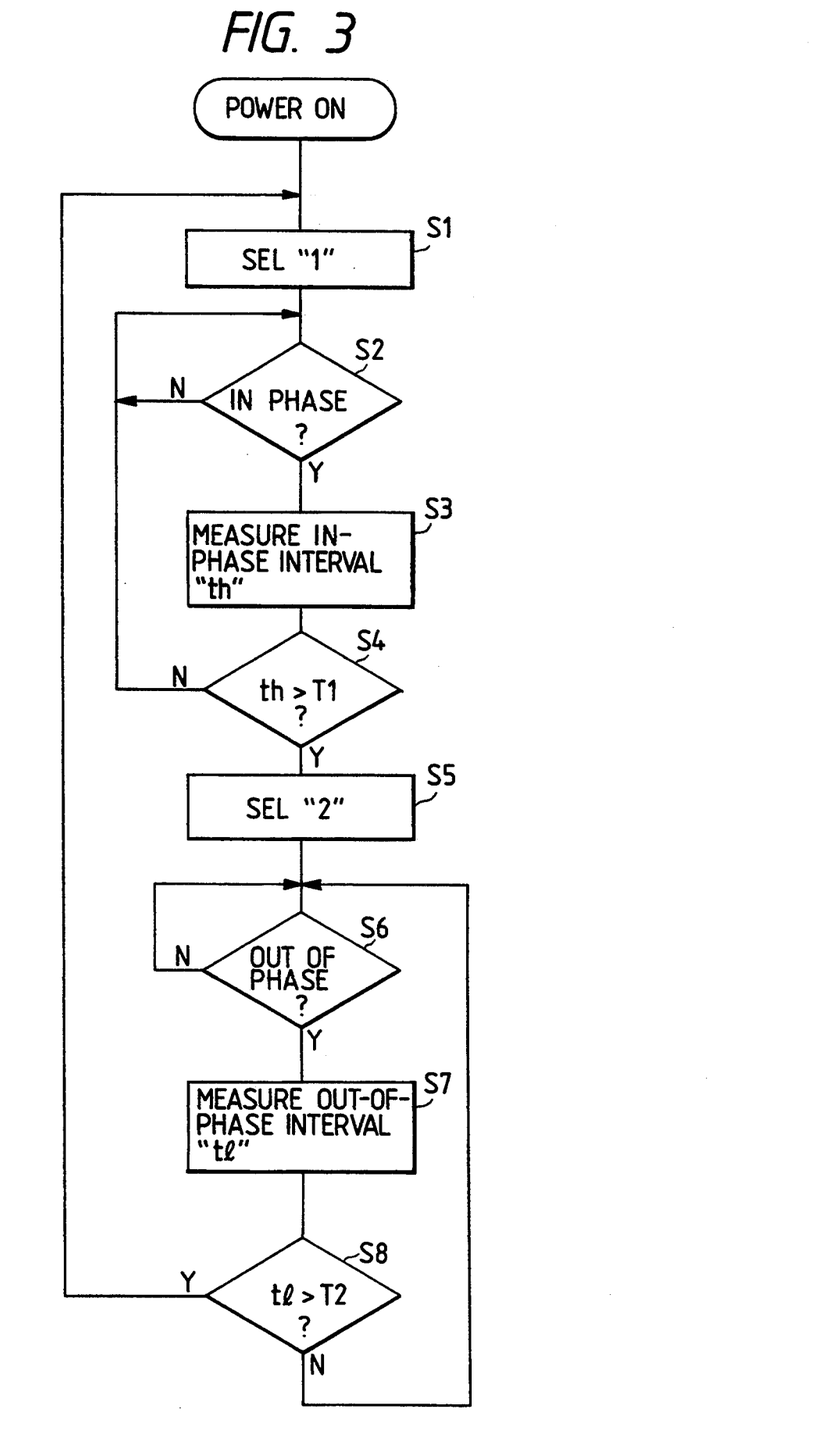
FIG. 3 shows a flow chart of the first embodiment of the time measurement circuit shown in FIG. 2.

FIG. 3 shows a flow chart of the first embodiment of the time measurement circuit 15 for representing a program stored in the ROM to be executed by the microprocessor.

Processing starts when POWER-ON. In step S1, the time measurement circuit 15 causes the selection circuit 14 shown in FIG. 2 to select the input "1", namely, the in-phase/out-of-phase signal. Then, the time measurement circuit 15 makes a decision as to whether or not the in-phase/out-of-phase signal indicates the in-phase condition in step S2. If NO, that is, the in-phase/out-of-phase signal indicates the out-of-phase (asynchronous) condition, processing loops this step S2. That is, the selection circuit 14 continues to select the input "1". If YES, that is, the in-phase/out-of-phase signal indicates the in-phase condition, processing proceeds to step S3. In step 3, the time measurement circuit 15 starts to measure a time interval "th" of a logic HIGH condition of the in-phase/out-of-phase signal, i.e., to measure the time interval of in-of-phase condition. In the following step S4, the time measurement circuit 15 makes a decision as to whether or not the time interval "th" is longer than a predetermined interval T1. If NO, that is, the time interval "th" is not longer than T1, processing returns to step S2. If YES, the time interval "th" is longer than T1, processing proceeds to step S5. In step S5, the time measurement circuit 15 causes the selection circuit 14 to select the input "2", namely, the logic HIGH level.

In the following step S6, the time measurement circuit 15 makes a decision as to whether or not the in-phase/out-of-phase signal indicates the out-of-phase condition. If NO, that is, the in-phase/out-of-phase signal indicates the in-phase condition, processing loops this step S6. That is, the selection circuit 14 continues to select the input "2". If YES, that is, the in-phase/out-of-phase signal indicates the out-of-phase condition, processing proceeds to step S7. In step S7, the time measurement circuit 15 starts to measure a time interval "t1" of a logic LOW condition of the in-phase/out-of-phase signal, i.e., to measure the time interval of the out-of-phase condition. In the following step S8, the time measurement circuit 15 makes a decision as to whether or not the time interval "t1" is longer than a predetermined interval T2. If NO, that is, the time interval "t1" is not longer than T2, processing returns to step S6. That is, the selection circuit 14 continues to select the input "2". If YES, the time interval "t1" is longer than T2, processing returns to step S1. That is, the comparator determines the condition of synchronizing control signal because the selection circuit 14 selects the input "1".

As mentioned above, the receiving circuit C1 of the first embodiment for receiving a transmitted data signal which is coded by a first chip code signal having a predetermined signal pattern 202 to spread spectrum of the transmitted data and is modulated by a carrier signal, comprises: the antenna 1 as receiving means for receiving the transmitted data signal; the multiplier 2 and the local oscillator 4 as demodulation means for demodulating the received data signal; the chip code signal generation circuit 5 for generating a second chip code signal having the predetermined signal pattern 202; the multiplier 3 as decoding means for decoding the demodulated data signal with the second chip code signal 20b; a synchronous condition detection circuit 16 for detecting whether the second chip code signal 20b is in an asynchronous condition with said first chip code signal included in the received data signal to produce an asynchronous detection signal; the offset signal generation circuit 5a and counter and logic circuit 5b as synchronizing means for synchronizing the second chip code signal with the first chip code signal included in the received data signal in response to the asynchronous detection signal; the time measurement circuit 15 and the selection circuit 14 as control means responsive to the detection means for measuring a time interval for which the asynchronous detection signal is produced continuously and for supplying the asynchronous detection signal to the offset signal generation circuit 5a when the time interval is longer than a predetermined interval.

Figure 4:
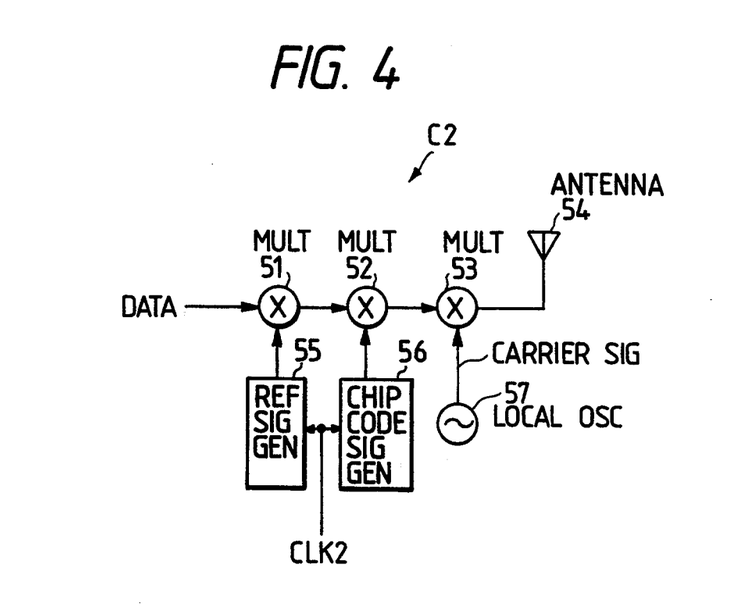
FIG. 4 is a block diagram of a second embodiment of a transmitting circuit.
Figure 5:
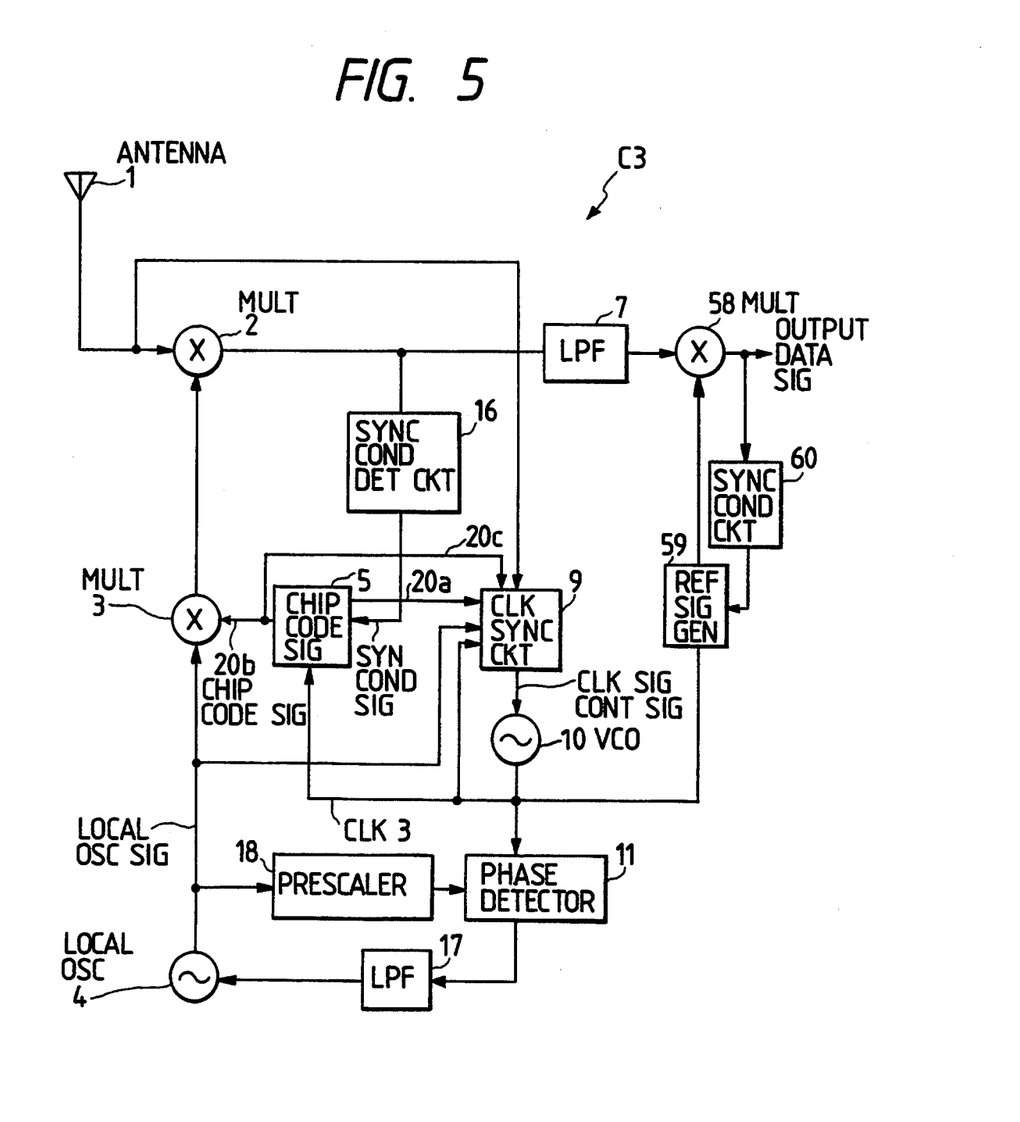
FIG. 5 is a block diagram of the second embodiment a receiving circuit.

Hereinbelow will be described a second embodiment of this invention with reference to drawings. FIG. 4 is a block diagram of the second embodiment of a transmitting circuit C2 employing the direct-sequence spread spectrum communication system. FIG. 5 is a block diagram of the second embodiment a receiving circuit C3 employing the direct-sequence spread spectrum commemoration system.

The transmitting circuit C2 comprises a reference signal generator 55 response to a clock signal CLK2 for generating a reference signal having a predetermined serial data pattern, a multiplier 51 for multiplying input data by the reference signal, a chip code generator 56 responsive to the clock signal CLK2 for generating a chip code signal, a multiplexer 52 for multiplying the data from the multiplier 51 by the chip code signal, a local oscillator 57 for generating a local oscillation signal, a multiplier 53 for multiplying an output of the multiplier 52 by the local oscillation signal from the local oscillator 57. An output of the multiplier 53 is transmitted by an antenna 54. The input data is subjected to the spectrum spread sequence by multiplied by the chip code signal with the multiplier 52.

The receiving circuit C3 performs demodulation with inverse spread spectrum sequence. In FIG. 5, the receiving circuit C3 comprises a chip code signal generator 5 for generating a chip code signal as shown by the waveform 202 which is the same signal as the output of the chip code signal generator 55 of the transmitting circuit C2, a local oscillator 4 for generating a local oscillation signal having the same frequency as the local oscillator 57 of the transmitting circuit C2, a multiplier 3 for multiplying the local oscillation signal by the chip code signal 20b, a multiplier 2 for multiplying an input signal (data) received by an antenna 1 by the output of the multiplier 3, a lowpass filter 7 for filtering an output of the multiplier 2 to remove high frequency components, a synchronizing condition detection circuit 16 for detecting whether the chip code signal generated by the chip code signal generation circuit 5 is in phase with the chip code signal included in the input signal, a clock synchronizing circuit 9 responsive to the input signal and a clock signal for generating a clock signal control signal to synchronize the clock signal CLK3 with the received input signal, a clock signal generation circuit (VCO) 10 for generating the clock signal CLK3 with an oscillation frequency controlled by the clock signal control signal, a pre-scaler 18 for frequency dividing the local oscillation signal; a phase detector 11 for detecting a phase difference between the divided local oscillation signal and the clock signal CLK3, and a lowpass filter 17 for filtering the output of the phase detector 11, a reference signal generator 59 responsive to the clock signal for generating the reference signal having the same waveform as that of the output of the reference signal generator 55 of the transmitting circuit C2, and a multiplier 58 for multiplying an output of the lowpass filter 7 by the reference signal from the reference signal generator 59 to remove the reference component from the output of the lowpass filter, namely, to decode the data signal with respect to the reference signal, and a synchronizing condition detection circuit 60 for detecting a synchronizing condition between the reference signal from the reference signal generation circuit 59 and the received signal to cause the reference signal generation circuit 59 to synchronize the reference signal with the received signal.

The chip code signal generation circuit 5 generates the chip code signals 20a–20c in response the clock signal CLK3 and the synchronizing condition signal. More specifically, the chip code signal generation circuit 5 generates the chip code signals 20a–20c with unchanging of a phase relation of the data pattern of the chip code signal 20b against the input signal when the synchronizing condition signal indicates a synchronized condition and it generates the chip code signals 20a–20c with changing of a phase relation of the data pattern of the chip code signals 20a–20c against the input signal when the synchronizing condition signal indicates an asynchronous condition successively until the synchronizing condition signal indicates the synchronous condition. The data pattern is predetermined and is repeatedly outputted. Therefore, there is always one synchronizing condition within one circulation of the data pattern, so that the synchronizing condition can be caught by the successive phase shifting of the chip code signal and during this, the synchronizing condition signal is monitored.

The reference signal generator 59 generates the reference signal in response to the clock signal and the multiplier 58 removes the reference signal component included in the received signal.

Figure 11:
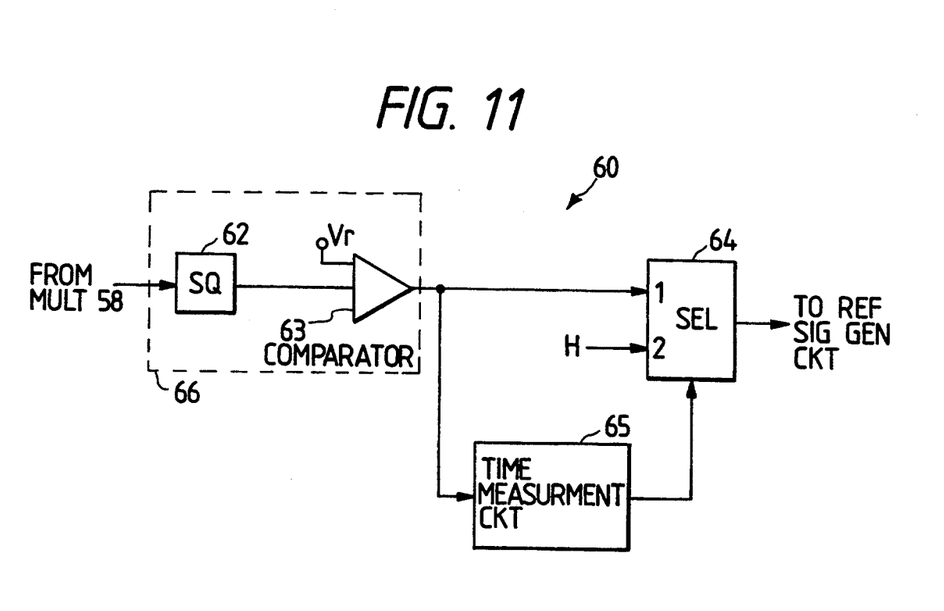
FIG. 11 is a block diagram of the synchronizing condition detection circuit of the second embodiment.
Figure 12:
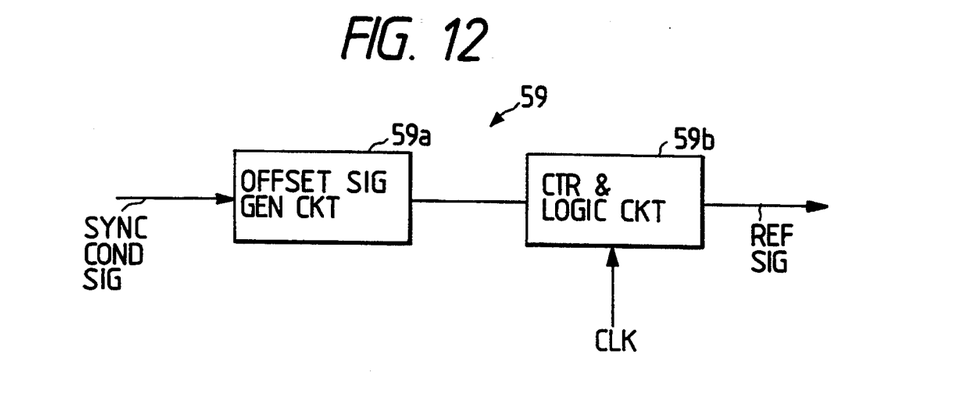
FIG. 12 is a block diagram of the reference signal generation circuit of the third embodiment.

FIG. 11 is a block diagram of the synchronizing condition detection circuit 60 of the second embodiment. FIG. 12 is a block diagram of the reference signal generation circuit 59 of the third embodiment.

The reference signal generation circuit 59 generates the reference signal in response the clock signal and the synchronizing condition signal from the synchronizing condition detection circuit 60. More specifically, the reference signal generation circuit 59 generates the reference signal with unchanging of the data pattern of the reference code when the synchronizing condition signal from the synchronizing condition detection circuit 60 indicates a synchronized condition and it generates the reference code signal with changing of a phase of the data pattern of the reference code when the synchronizing condition signal indicates an asynchronous condition successively until the synchronizing condition signal indicates the synchronizing condition. The data pattern is predetermined and is repeatedly outputted. Therefore, there is always one synchronizing condition within one circulation of the data pattern of the reference code signal, so that the synchronizing condition can be caught by the successive phase shifting of the reference code signal and during this, the synchronizing condition signal is monitored.

The synchronizing condition detection circuit 60 comprises: a squaring circuit 62 for detecting a degree of synchronizing condition of the reference code signal with the received input signal; a comparator 63 for comparing an output of the squaring circuit 62 with a reference voltage Vr to an in-phase/out-of-phase signal; a selection circuit 64 for selecting either of input "1", namely, the in-phase/out-of-phase signal or input "2", namely, logic High level; and a time measurement circuit 65 for measuring intervals of in-phase and out-of-phase conditions.

The first synchronizing condition detection circuit 60 causes the reference code signal generation circuit 59 to synchronize the reference code signal with the received input signal in the initial condition, such as a condition just after the power ON condition and when the out-of-phase condition continues for a predetermined interval T2. On the other hand, the synchronizing condition detection circuit 60 does not cause the reference code signal generation circuit 59 to synchronize the reference signal with the received input signal when the in-phase condition does not continues for a predetermined interval T1. The operation of the time measurement circuit 65 is the same as the time measurement circuit 15, that is, it is represented by the flow chart shown in FIG. 3. Therefore, a detailed description is omitted.

Hereinbelow will be described operation of the second embodiment with reference to drawings.

Figure 6:
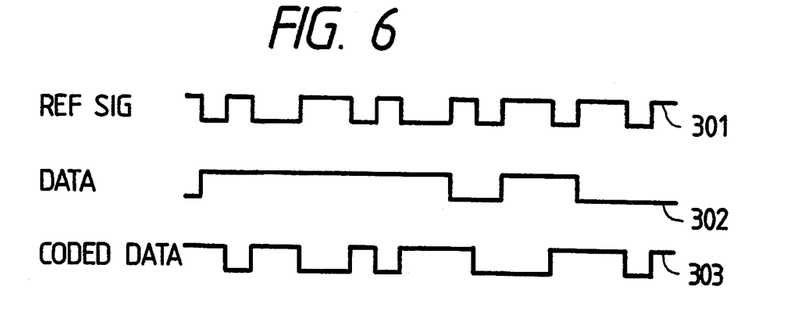
FIG. 6 shows waveforms of signals at respective points of the receiving circuit of the second and third embodiment.

FIG. 6 shows waveforms of signals at respective points of the receiving circuit C3.

In FIG. 4, data to be transmitted is multiplied by the reference signal from the reference signals generation circuit 55 with the multiplier 51. An output of the multiplier 52 is multiplied by the chip code signal from the chip code signal generation circuit 56 and further multiplied by the local oscillation signal from the local oscillation circuit 57. Then, the data including components of the reference signal, the chip code signal and the local oscillation signal is transmitted by the antenna 54.

When data has a lower data rate than the reference signal, a bandwidth of the transmitted signal is determined by the reference signal. That is, the lower limit of the data rate of the output of the multiplier 51 is determined by the reference signal. This prevents the data rate from decreasing under a desirable rate in the transmission circuit which receives data in the variable data rate. A frequency relation between the chip code signal and the reference signal is determined such as the frequency relation between the chip code signal and the data having a fixed data rate which frequency relation was conventionally suitably determined.

In FIG. 6, data represented by waveform 302 is multiplied by the reference signal represented by waveform 301 wherein the data is synchronized with the reference signal. The resultant data, namely, coded data is represented by waveform 303. Then, the coded signal is transmitted after the spectrum spreading from the antenna 54.

In the receiving circuit C3, the output of the lowpass filter 7 is multiplied by the reference signal from the reference signal generation circuit 59 to decode the received data. The reference signal generator generates the reference signal from the clock signal CLK3 to provide a synchronous relation between the chip code signal and the reference signal. If data is inputted to the transmitting circuit in a variable rate, the received data has a fixed bandwidth because the lower limit of the data rate is determined by the reference signal. Therefore, if data having a low data rate is received, it is not necessary to change the lowpass filter 7 to another lowpass filter having a lower cut-off frequency.

In this embodiment, the synchronization between the reference signals of the transmitting circuit C2 and the receiving circuit C3 is performed by using a correlation between the reference signal of the transmitting circuit C2 and the receiving circuit C3. However, there are various methods of synchronization, for example, a synchronization method using setting a start time or a start position.

As mentioned above, according to this invention, in the receiving circuit, the same lowpass filter 7 can be used if the data rate of the data is lower than the data rate of the reference signal because the data is transmitted with spectrum spread after coded by the reference signal having a suitable data rate against the low pass filter 7. Because the lowpass filter 7 is not necessary to be changed, the receiving circuit is simplified and can be miniaturized.

As mentioned above, the receiving circuit C5 for receiving a transmitted data signal which has a variable data rate V and is coded by a first chip code signal having a predetermined signal pattern (201) to spread spectrum of the transmitted data and a data rate C, the transmitted data signal being coded by a first reference code signal having a predetermined signal pattern (301) and having a data rate R, the transmitted data signal being modulated by a carrier signal, the data rate C being higher than the variable data rate V in order to spread spectrum of the data signal, the data rate R is higher than the data rate V in order to provide a limitation of a data rate of the data signal coded by the reference code signal, comprises: the antenna 1 as receiving means for receiving the transmitted data signal; the multiplier 2 as demodulation means for demodulating the received data signal; the chip code signal generation circuit 5 for generating a second chip code signal 20b having the predetermined signal pattern; the multiplier 3 as decoding means for decoding the demodulated data signal with the second chip code signal; the synchronizing condition detection circuit 16 as detection means for detecting whether the second chip code signal is in an asynchronous condition with the received data signal to produce an asynchronous detection signal; the offset signal generation circuit 5a and the counter and logic circuit 5b as synchronizing means for synchronizing the second chip code signal 20b with the first chip code signal included in the received data signal in response to the asynchronous detection signal; the time measurement circuit 15 and the selection circuit 14 as control means responsive to the detection means for measuring a time interval for which the asynchronous detection signal is produced continuously and for supplying the asynchronous detection signal to the synchronizing means when the time interval is longer than a predetermined interval; the reference code signal generation circuit 59 for generating a second reference code signal having the predetermined signal pattern (301); and the multiplier 58 as second decoding means for decoding the demodulated data signal with the second reference code signal.

Hereinbelow will be described a third embodiment of this invention with reference to drawings.

Figure 7:
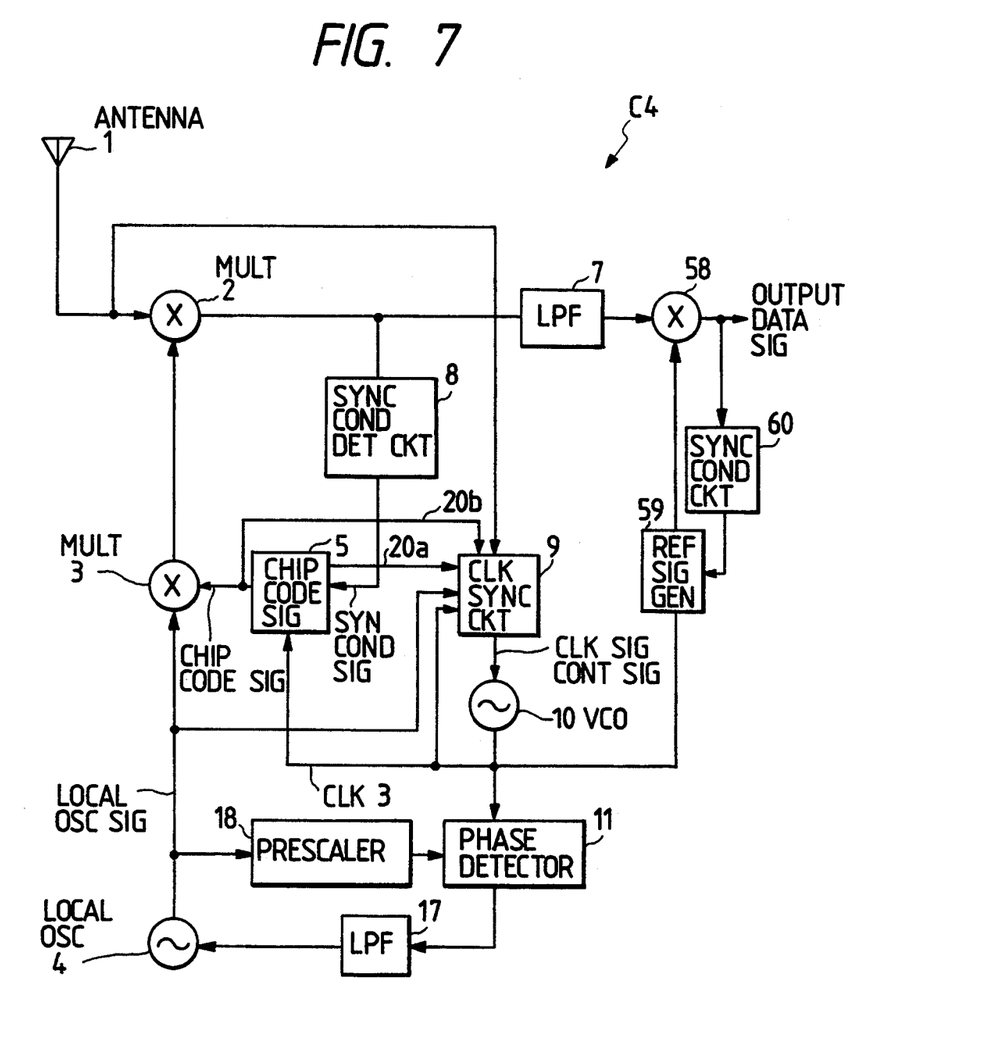
FIG. 7 is a block diagram of the third embodiment of a receiving circuit.

FIG. 7 is a block diagram of the third embodiment of a receiving circuit C4.

The structure of the receiving circuit C4 is the same as that of the receiving circuit C3 basically. A difference is in the synchronizing detection circuit 8. That is, the synchronizing between the chip code signal from the chip code signal generator 5 of the receiving circuit C4 and the received data is performed adaptively. More specifically, the logic HIGH level is sent to the chip code signal generation circuit 5 in the synchronizing condition of the chip code signal and in the condition where asynchronous condition is shorter than a predetermined interval T2 to prevent frequent synchronizing operations and unstable conditions. The received data is transmitted by the transmitting circuit C2 of the second embodiment. Moreover, the output of the lowpass filter 7 is decoded by the reference signal from the reference signal generation circuit 59, so that if data having a low data rate is received, it is not necessary to change the lowpass filter 7.

In the above-mentioned embodiments, multipliers are used. However, Exclusive OR circuits can be used in place of the multipliers.

What is claimed is:

1. A receiving circuit for receiving a transmitted data signal which is coded by a first chip code signal having a predetermined signal pattern to spread spectrum of the transmitted data and is modulated by a carrier signal, said receiving circuit comprising:
   (a) receiving means for receiving said transmitted data signal;
   (b) demodulation means for demodulating said received data signal;
   (c) chip code signal generation means for generating a second chip code signal having said predetermined signal pattern;
   (d) decoding means for decoding said demodulated data signal with said second chip code signal;
   (e) detection means for detecting whether said second chip code signal is in an asynchronous condition with said received data signal to produce an asynchronous detection signal;
   (f) synchronizing means for synchronizing said second chip code signal with said first chip code signal included in said received data signal in response to said asynchronous detection signal; and
   (g) control means responsive to said detection means for measuring a time interval for which said asynchronous detection signal is produced continuously and for supplying said asynchronous detection signal to said synchronizing means when said time interval is longer than a predetermined interval.

2. A receiving circuit as claimed in claim 1, wherein said synchronizing means has phase shifting means for successively phase shifting said second chip code signal in the presence of said asynchronous detection signal to detect a synchronous condition between said first chip signal included in the received signal and the second chip signal.

3. A transmitting circuit for transmitting a data signal having variable data rate, comprising:
   (a) first coding means for coding said data signal with a first coding signal having a first predetermined signal pattern and a first data rate;
   (b) second coding means for coding said data signal with a second coding signal having a second predetermined signal pattern and a second data rate; and
   (c) modulation means for modulating said data signal coded by said first and second coding signals, said second data rate is higher than said variable data rate in order to spread spectrum of said data signal, said second data rate is higher than said first data rate in order to provide a lower limitation of a data rate of said data signal coded by said first coding means.

4. A receiving circuit for receiving a transmitted data signal which has a variable data rate V and is coded by a first chip code signal having a first predetermined signal pattern to spread spectrum of the transmitted data and a data rate C, said transmitted data being coded by a first reference code signal having a second predetermined signal pattern and having a data rate R, said transmitted data signal being modulated by a carrier signal said data rate C being higher than said variable data rate V in order to spread spectrum of said data signal, said data rate R being higher than said variable data rate V in order to provide a limitation of a data rate of said data signal coded by said reference code signal, said receiving circuit comprising:
   (a) receiving means for receiving said transmitted data signal;
   (b) demodulation means for demodulating said received data signal;
   (c) chip code signal generation means for generating a second chip code signal having said predetermined signal pattern;
   (d) decoding means for decoding said demodulated data signal with said second chip code signal;
   (e) detection means for detecting whether said second chip code signal is in an asynchronous condition with said received data signal to produce an asynchronous detection signal;
   (f) synchronizing means for synchronizing said second chip code signal with said first chip code signal included in said received data signal in response to said asynchronous detection signal;
   (g) reference code signal generation means for generating a second reference code signal having said predetermined signal pattern; and
   (h) second decoding means for decoding said demodulated data signal with said second reference code signal.

5. A receiving circuit as claimed in claim 4, wherein said synchronizing means has phase shifting means for successively phase shifting said second chip code signal in the presence of said asynchronous detection signal to detect a synchronous condition between said first chip signal included in the received signal and the second chip signal.

6. A receiving circuit as claimed in claim 4, further comprising:
   (a) second detection means for detecting whether said second reference code signal is in an asynchronous condition with said received data signal to produce a second asynchronous detection signal;
   (b) second synchronizing means for synchronizing said second reference code signal with said first reference code signal included in said received data signal in response to said second asynchronous detection signal; and
   (c) second control means responsive to said second detection means for measuring a second time interval for which said second asynchronous detection signal is produced continuously and for supplying said second asynchronous detection signal to said second synchronizing means when said second time interval is longer than a second predetermined interval.

7. A receiving circuit for receiving a transmitted data signal which has a variable data rate V and is coded by a first chip code signal having a first predetermined signal pattern to spread spectrum of the transmitted data and a data rate C, said transmitted data being coded by a first reference code signal having a second predetermined signal pattern and having a data rate R, said transmitted data signal being modulated by a carrier signal, said data rate C being higher than said variable data rate V in order to spread spectrum of said data signal, said data rate R being higher than said variable data rate V in order to provide a limitation of a data rate of said data signal coded by said reference code signal, said receiving circuit comprising:
   (a) receiving means for receiving said transmitted data signal;
   (b) demodulation means for demodulating said received data signal;
   (c) chip code signal generation means for generating a second chip code signal having said predetermined signal pattern;
   (d) decoding means for decoding said demodulated data signal with said second chip code signal;
   (e) detection means for detecting whether said second chip code signal is in an asynchronous condition with said received data signal to produce an asynchronous detection signal;
   (f) synchronizing means for synchronizing said second chip code signal with said first chip code signal included in said received data signal in response to said asynchronous detection signal;
   (g) control means responsive to said detection means for measuring a time interval for which said asynchronous detection signal is produced continuously and for supplying said asynchronous detection signal to said synchronizing means when said time interval is longer than a predetermined interval;
   (h) reference code signal generation means for generating a second reference code signal having said predetermined signal pattern; and
   (i) second decoding means for decoding said demodulated data signal with said second reference code signal.

8. A receiving circuit as claimed in claim 7, wherein said synchronizing means has phase shifting means for successively phase shifting said second chip code signal in the presence of said asynchronous detection signal to detect a synchronous condition between said first chip signal included in the received signal and the second chip signal.

9. A receiving circuit as claimed in claim 7, further comprising:
 (a) second detection means for detecting whether said second reference code signal is in an asynchronous condition with said received data signal to produce a second asynchronous detection signal;
 (b) second synchronizing means for synchronizing said second reference code signal with said first reference code signal included in said received data signal in response to said second asynchronous detection signal; and
 (c) second control means responsive to said second detection means for measuring a second time interval for which said second asynchronous detection signal is produced continuously and for supplying said second asynchronous detection signal to said second synchronizing means when said second time interval is longer than a second predetermined interval.

* * * * *